United States Patent [19]

White, Jr.

[11] 3,857,835
[45] Dec. 31, 1974

[54] 1-(5-(P-NITRO PHENYL)FURFURYLIDENE) AMINO)-5,6-DIHYDROURACIL

[75] Inventor: Ralph L. White, Jr., Norwich, N.Y.

[73] Assignee: Morton-Norwich Products, Inc., Norwich, N.Y.

[22] Filed: Jan. 25, 1974

[21] Appl. No.: 436,464

[52] U.S. Cl............................. 260/240 G, 424/251
[51] Int. Cl............................................ C07d 51/30
[58] Field of Search.................... 260/240 G, 240 A

[56] References Cited
UNITED STATES PATENTS

| 3,397,199 | 8/1968 | Dunn | 260/240 A |
| 3,415,821 | 12/1968 | Davis et al. | 260/240 G |
| 3,803,136 | 4/1974 | Schwan et al. | 260/240 G |

OTHER PUBLICATIONS

Chemical Abstracts Vol. 66, abst. No. 46390t (1967) (abst. of Kloetzer et al., Monatsh. Chem. Vol. 96, pp. 1731–1738 (1965).

Chemical Abstracts, Vol. 68, abst. No. 105230g (1968) (abst. of British Pat. 1,089,737).

*Primary Examiner*—John D. Randolph
*Attorney, Agent, or Firm*—Anthony J. Franze

[57] ABSTRACT

The title compound is an effective muscle relaxant.

1 Claim, No Drawings

1-{[5-(P-NITRO PHENYL)FURFURYLIDENE]AMINO}-5,6-DIHYDROURACIL

This invention is concerned with the compound 1-{[5-(p-nitrophenyl)furfurylidene]amino}-5,6-dihydrouracil. It possesses pharmacological properties. For example, when administered intravenously to the rat in a dose of 2.5 mg/kg in tetrahydrofuran as the solvent, inhibition of muscle contraction of the gastrocnemius muscle is elicited to the extent of at least 50 percent, such inhibition being independent of any solvent effect.

In order that this invention may be readily available to and understood by those skilled in the art the following now preferred method for its preparation is set forth.

In a 1.0 l. flask were placed 32.5 g (0.15 mole) of 1-(benzylideneamino)-5,6-dihydrouracil, 30 ml of concentrated hydrochloric acid and 500 ml of water. The mixture was distilled until the distillate was clear (120 ml of distillate), and then the pot contents were concentrated under reduced pressure to a white solid. The white solid was dissolved with heating in 250 ml of dimethylformamide and 50 ml of water, and this solution was added to 32.5 g (0.15 mole) of 5-(p-nitrophenyl)-furfuraldehyde dissolved in 400 ml of dimethylformamide. The dark solution was heated to a boil and was then allowed to cool for 3.0 hr. The mixture was poured into 1,200 ml of water. The resulting solid was collected, dissolved in 600 ml of hot dimethylformamide (Darco), and filtered. The recrystallized solid (25.2 g, 51 percent yield) was collected, m.p. 284°–287°. A 1.0 g sample recrystallized from 20 ml of dimethylformamide gave yellow crystals, m.p. 287-288°.

Anal. Calcd. for $C_{15}H_{12}N_4O_5$: C, 54.88; H, 3.68; N, 17.07 Found: C, 54.78; H, 3.81; N, 17.19

What is claimed is:

1. 1-{[5-(p-Nitrophenyl)furfurylidene]amino}-5,6-dihydrouracil.

* * * * *